US008260775B2

(12) United States Patent
Ahn et al.

(10) Patent No.: US 8,260,775 B2
(45) Date of Patent: Sep. 4, 2012

(54) GEOTEMPORAL SEARCH

(75) Inventors: David Dongjah Ahn, San Francisco, CA (US); Michael Paul Bieniosek, San Mateo, CA (US); Ian Robert Collins, San Francisco, CA (US); Franco Salvetti, San Francisco, CA (US); Toby Takeo Sterrett, San Francisco, CA (US); Giovanni Lorenzo Thione, San Francisco, CA (US); Grigor Shirakyan, Kirkland, WA (US); Hamed Esfahani, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 93 days.

(21) Appl. No.: 12/686,128

(22) Filed: Jan. 12, 2010

(65) Prior Publication Data

US 2011/0173193 A1 Jul. 14, 2011

(51) Int. Cl.
*G06F 7/00* (2006.01)
(52) U.S. Cl. .................................. 707/724; 707/725
(58) Field of Classification Search .................. None
See application file for complete search history.

(56) References Cited

U.S. PATENT DOCUMENTS

| 6,650,998 | B1 | 11/2003 | Rutledge |
| 2004/0119759 | A1* | 6/2004 | Barros ........................... 345/853 |
| 2004/0217884 | A1* | 11/2004 | Samadani et al. ....... 340/995.14 |
| 2004/0225635 | A1* | 11/2004 | Toyama et al. .................... 707/1 |
| 2005/0273346 | A1 | 12/2005 | Frost |
| 2006/0101005 | A1* | 5/2006 | Yang et al. ......................... 707/3 |
| 2008/0082578 | A1* | 4/2008 | Hogue et al. ................. 707/104.1 |
| 2008/0306921 | A1* | 12/2008 | Rothmuller et al. .............. 707/3 |
| 2009/0012953 | A1 | 1/2009 | Chu |
| 2009/0100018 | A1* | 4/2009 | Roberts ............................. 707/3 |
| 2010/0082397 | A1* | 4/2010 | Blegen ............................ 705/10 |
| 2010/0185976 | A1* | 7/2010 | Sadanandan ................... 715/786 |

(Continued)

FOREIGN PATENT DOCUMENTS

WO WO2007027608 A2 3/2007

OTHER PUBLICATIONS

Alexander Markowetz, Yen-Yu Chen, Torsten Suel, Xiaohui Long, and Bernhard Seeger, Design and Implementation of a Geographic Search Engine, Eighth International Workshop on the Web and Databases (WebDB 2005), Jun. 16-17, 2005, Baltimore, Maryland, 6 pages, http://citeseerx.ist.psu.edu/viewdoc/download?doi=10.1.1.112.3063&rep1&type=pdf.

(Continued)

*Primary Examiner* — Vei-Chung Liang
(74) *Attorney, Agent, or Firm* — Shook, Hardy & Bacon L.L.P.

(57) ABSTRACT

Computer-readable media and a computing device are described for providing geotemporal search and a search interface therefor. A search interface having a location portion and a timeline portion is provided. A geographic area is selected in the location portion by adjusting the visible area of a map. A temporal window is selected in the timeline portion by adjusting sliders along a timeline to a desired start and end time. The start and end times can be in the past, present, or future. A geotemporal search is executed based on the selected geographic area and temporal window to identify search results having associated metadata indicating a relationship to the selected geographic area and temporal window. One or more search terms are optionally provided to further refine the geotemporal search.

16 Claims, 9 Drawing Sheets

U.S. PATENT DOCUMENTS

2010/0185984 A1\* 7/2010 Wright et al. .................. 715/833
2011/0060480 A1\* 3/2011 Mottla et al. ...................... 701/2

OTHER PUBLICATIONS

Orkut Buyukkokten, Junghoo Cho, Hector Gracia-Molina, Narayanan Shivakumar, Department of Computer Science, Stanford University, Stanford, CA 94305, and Luis Gravano, Department of Computer Science, Columbia University, 1214 Amsterdam Ave., New York, NY 10027, Retrieve Date: Nov. 16, 2009, 6 pages, http://citeseerx.ist.psu.edu/viewdoc/download?doi+10.1.1.21.3119&rep=rep1&type=pdf.

KIRKLANDREPORTER.com, Kirkland Police Blotter, Apr. 15-21, 2009, weekly Kirkland Police blotter, http://www.pnwlocalnews.com/east_king/kir/news/44174132.html.

Washington Post Timespace: World, Nov. 9, 2009, http://specials.washingtonpost.com/timespace/world/.

\* cited by examiner

GEOTEMPORAL SEARCH

BACKGROUND

Internet search has become a primary method by which people gather information for use in their daily lives. Many search mechanisms have been developed to aid users in quickly and efficiently identifying the information they seek from the extraordinary amount of data available on the Internet.

SUMMARY

Embodiments of the invention are defined by the claims below, not this summary. A high-level overview of various aspects of the invention are provided here for that reason, to provide an overview of the disclosure, and to introduce a selection of concepts that are further described below in the Detailed-Description section below. This Summary is not intended to identify key features or essential features of the claimed subject matter, nor is it intended to be used as an aid in isolation to determine the scope of the claimed subject matter.

An embodiment of the invention is directed to providing geotemporal search. Geotemporal search employs a selection of a geographic location along with a selection of a temporal window, e.g. a period of time, to identify one or more search results. The search results may be narrowed or expanded by narrowing or expanding, respectively, the geographic location selection or the temporal region selection. Thereby, a user can identify search results that have relevance to a specific place and time. Additionally, text-based or content-based search queries are optionally supplied to further narrow or specify the search criteria.

DESCRIPTION OF THE DRAWINGS

Illustrative embodiments of the invention are described in detail below with reference to the attached drawing figures, and wherein.

DETAILED DESCRIPTION

Figure 1:
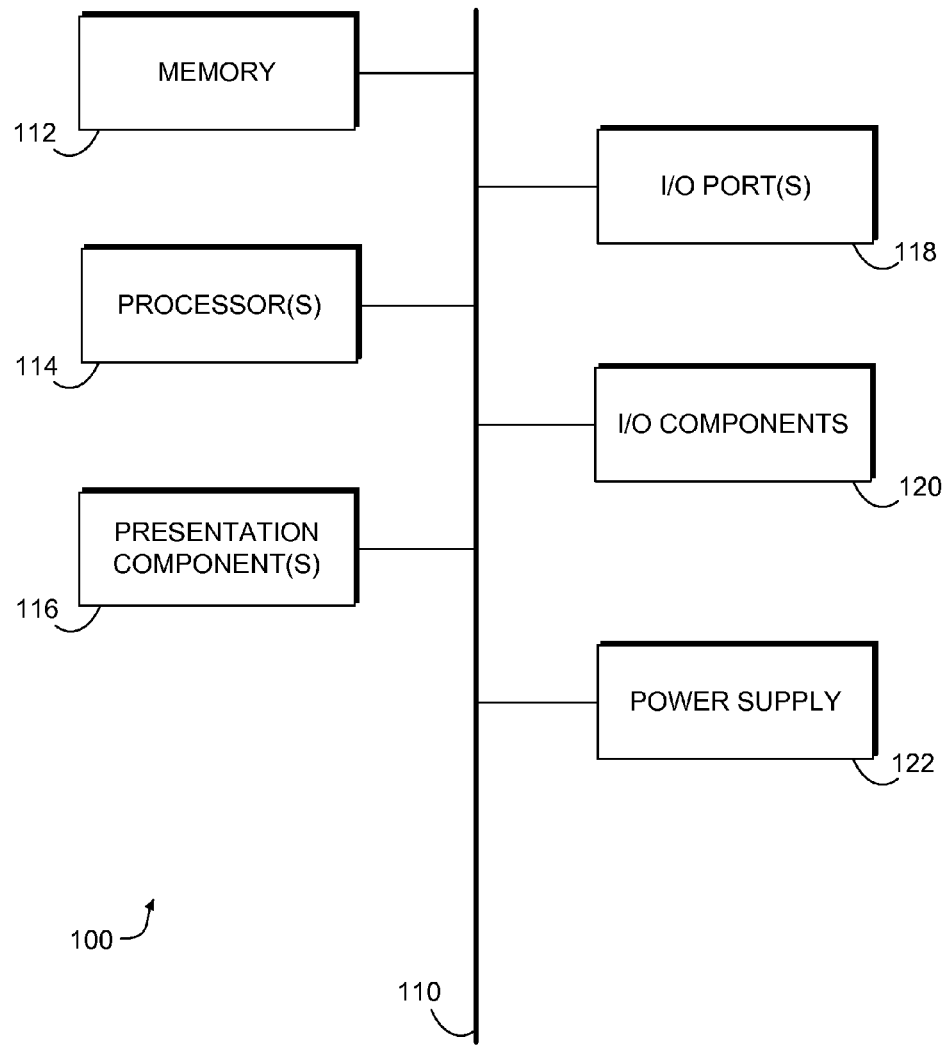
FIG. 1 is a block diagram depicting an exemplary computing device suitable for use in accordance with embodiments of the invention.

The subject matter of embodiments of the invention is described with specificity herein to meet statutory requirements. But the description itself is not intended to necessarily limit the scope of claims. Rather, the claimed subject matter might be embodied in other ways to include different steps or combinations of steps similar to the ones described in this document, in conjunction with other present or future technologies. Terms should not be interpreted as implying any particular order among or between various steps herein disclosed unless and except when the order of individual steps is explicitly described.

Embodiments of the invention provide computer-readable media, computing devices, methods, and interfaces for providing geotemporal search. Geotemporal search performs a search based on a selected geographic location and a selected temporal region, e.g., a period of time. Thereby, candidate search results that are relevant or associated with the selected location and time are identified and presented to a user.

In one embodiment, computer-readable media having computer-executable instructions embodied thereon that, when executed, perform a method for identifying search results based on a graphical user-interface are provided. By the method a visual representation of a user-selectable geographic region and a user-selectable timeline on a graphical interface are provided. A selection of a geographic area in the geographic region is received. The geographic area is a portion of the geographic region that is visible on the graphical interface. A selection of a temporal window in the timeline is received. Search results that are semantically related to both the geographic area and the temporal window are identified. The search results are identified from a datastore that houses search results that include associated metadata indicating a relationship with a location and a time.

In another embodiment, a computing device having a processor for generating a search interface is described. The search interface includes a location portion in which a visual representation of a geographic area is presented. The visual representation is useable to identify a user-selectable geographic location. The search interface also includes a timeline portion in which a visual representation of a user-selectable temporal window is identified. The timeline portion includes features for adjusting the location and length of the temporal window. Search results are identified based on a user-selected geographic location and temporal window. An indication of a pinpoint location associated with each of the search results is displayed at a respective location on the visual representation of the geographic area in the location portion. The indications are selectable to view content associated with the search result.

In another embodiment, computer-readable media having computer-executable instructions embodied thereon that, when executed, perform a method for providing a geotemporal search are described. By the method a selection of a geographic location is received via a geographic location selection portion of a graphical user-interface (GUI) that includes a map comprising one or more of a drawing, an image, and a hybrid image, and includes a feature for navigating the map to a desired geographic location. A selection of a time window is received via a temporal region selection portion of the GUI the includes a timeline having a feature for selecting a start time and an end time for the time window. The start time and the end time are in the past, present, or future. A search result is identified based on the selected geographic location and time window. The search result is related to the selected geographic location and time window or is associated with metadata corresponding to the geographic location and time window. An indication of the search result is presented on the map at a location therein that corresponds to the content and metadata associated with the search result.

Referring initially to FIG. 1, an exemplary operating environment for implementing embodiments of the present invention is shown and designated generally as a computing device 100. The computing device 100 is but one example of a suitable computing device and is not intended to suggest any limitation as to the scope of use or functionality of invention embodiments. Neither should the computing device 100 be interpreted as having any dependency or requirement relating to any one or combination of components illustrated.

Embodiments of the invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. Embodiments of the invention may be practiced in a variety of system configurations, including hand-held devices, consumer electronics, general-purpose computers, more specialty computing devices, etc. Embodiments of the invention may also be practiced in distributed computing environments where tasks are performed by remote-processing devices that are linked through a communications network.

With reference to FIG. 1, the computing device 100 includes a bus 110 that directly or indirectly couples the following devices: a memory 112, one or more processors 114, one or more presentation components 116, one or more input/output (I/O) ports 118, one or more input/output (I/O) components 120, and an illustrative power supply 122. The bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. We recognize that such is the nature of the art, and reiterate that the diagram of FIG. 1 is merely illustrative of an exemplary computing device 100 that can be used in connection with one or more embodiments of the present invention. Distinction is not made between such categories as "workstation," "server," "laptop," "hand-held device," etc., as all are contemplated within the scope of FIG. 1 and reference to "computing device."

The computing device 100 typically includes a variety of computer-readable media. By way of example, and not limitation, computer-readable media may comprises Random Access Memory (RAM); Read-Only Memory (ROM); Electronically Erasable Programmable Read-Only Memory (EEPROM); flash memory or other memory technologies; compact disc read-only memory (CDROM), digital versatile disks (DVD) or other optical or holographic media; magnetic cassettes, magnetic tape, magnetic disk storage or other magnetic storage devices, or any other medium that can be used to encode desired information and be accessed by the computing device 100.

The memory 112 includes computer-storage media in the form of volatile and/or nonvolatile memory. The memory 112 may be removable, nonremovable, or a combination thereof. Exemplary hardware devices include solid-state memory, hard drives, optical-disc drives, etc. The computing device 100 includes one or more processors that read data from various entities such as the memory 112 or the I/O components 120. The presentation component(s) 116 present data indications to a user or other device. Exemplary presentation components include a display device, speaker, printing component, vibrating component, etc.

The I/O ports 118 allow the computing device 100 to be logically coupled to other devices including the I/O components 120, some of which may be built in. Illustrative components include a microphone, joystick, game pad, satellite dish, scanner, printer, wireless device, etc.

Figure 2:
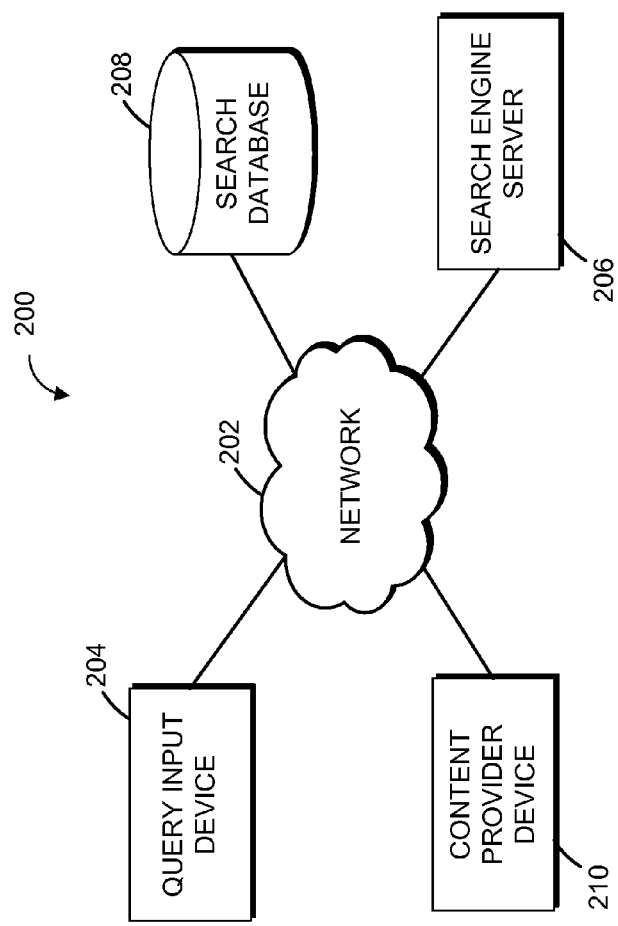
FIG. 2 is a block diagram depicting an exemplary network environment suitable for use in accordance with embodiments of the invention.

With reference now to FIG. 2, an exemplary network environment 200 suitable for use in accordance with embodiments of the invention is described. The environment 200 is but one example of an environment that can be used in embodiments of the invention and may include any number of components in a wide variety of configurations. The description of the environment 200 provided herein is for illustrative purposes and is not intended to limit configurations of environments in which embodiments of the invention can be implemented.

The environment 200 includes a network 202, a query input device 204, a search engine server 206, a search database 208, and a content provider device 210. The network 202 includes any computer network such as, for example and not limitation, the Internet, an intranet, private and public local networks, and wireless data or telephone networks. The query input device 204 is any computing device, such as the computing device 100, from which a search query can be provided in accordance with embodiments of the invention. For example, the query input device 204 might be a personal computer, a laptop, a server computer, a wireless phone or device, a personal digital assistant (PDA), or a digital camera, among others. In an embodiment, a plurality of query input devices 204, such as thousands or millions of query input devices 204, are connected to the network 202.

The search engine server 206 includes any computing device, such as the computing device 100, and provides at least a portion of the functionalities for providing a geotemporal search interface and search engine. In an embodiment, a group of search engine servers 206 or other computing devices share or distribute the functionalities used to provide the geotemporal search interface and search engine operations to a user population.

The search engine server 206 is communicatively coupled to the search database 208. The search database 208 includes any available computer storage device, or a plurality thereof, such as a hard disk drive, flash memory, optical memory devices, and the like. The search database 208 provides data storage for any desired data for identifying and providing search results. For example, the search database 208 may store cached candidate search results, metadata associated with candidate search results, uniform resource locator (URL) addresses to candidate search result content, and indexes of the candidate search results and metadata, among other data. The data is indexed in any desired manner including for example inverted indexing. In an embodiment, the search engine server 206 and the search database 208 are integrated in a single computing device or are directly communicatively coupled so as to allow direct communication between the devices without traversing the network 202.

The environment 200 may also include a content provider device 210. The content provider device 210 is any computing device, such as the computing device 100, from which content can be uploaded to the search database 208 or other storage device, or that can serve the content directly to the network 202. For example, the content provider device 210 may be a user's mobile phone from which the user records a video file and uploads the video file to a database, such as the search database 208, that is searchable by the search engine server 206. The content provider device 210 might also be a user's personal computer from which the user uploads content, or the content provider device 210 can be a server computer that serves content such as a blog or webpage that is accessible via the network 202.

The candidate search results stored by the search database 208 or served to the network 202 include any form of search results known in the art and each of the candidate search results includes associated metadata that indicate a relationship between the candidate search result and a location and time. The location is indicated in any desired manner including, for example and not limitation, a name of a city, country, or the like, or an address, longitude and latitude coordinates, or other location identifier. The time or date associated with the candidate search result is also indicated in any available manner.

The metadata associated with the candidate search results is provided by any available method. For example, and not limitation, the candidate search result may be parsed to identify location and time related elements within the content thereof and to determine semantic relationships between the candidate search result and the identified location and time elements. Additionally, the metadata can be user-specified and associated with the candidate search results or automatically identified based on a current location and time of the content provider device 210 when the candidate search results are provided to the search database 208. In an embodiment, a location of the content provider device 210 is automatically identified based on global positioning system (GPS) capabilities of the content provider device 210 or based on an Internet protocol (IP) address of the content provider device 210. A time may also be automatically identified based on a clock included with the content provider device 210.

Figure 3:
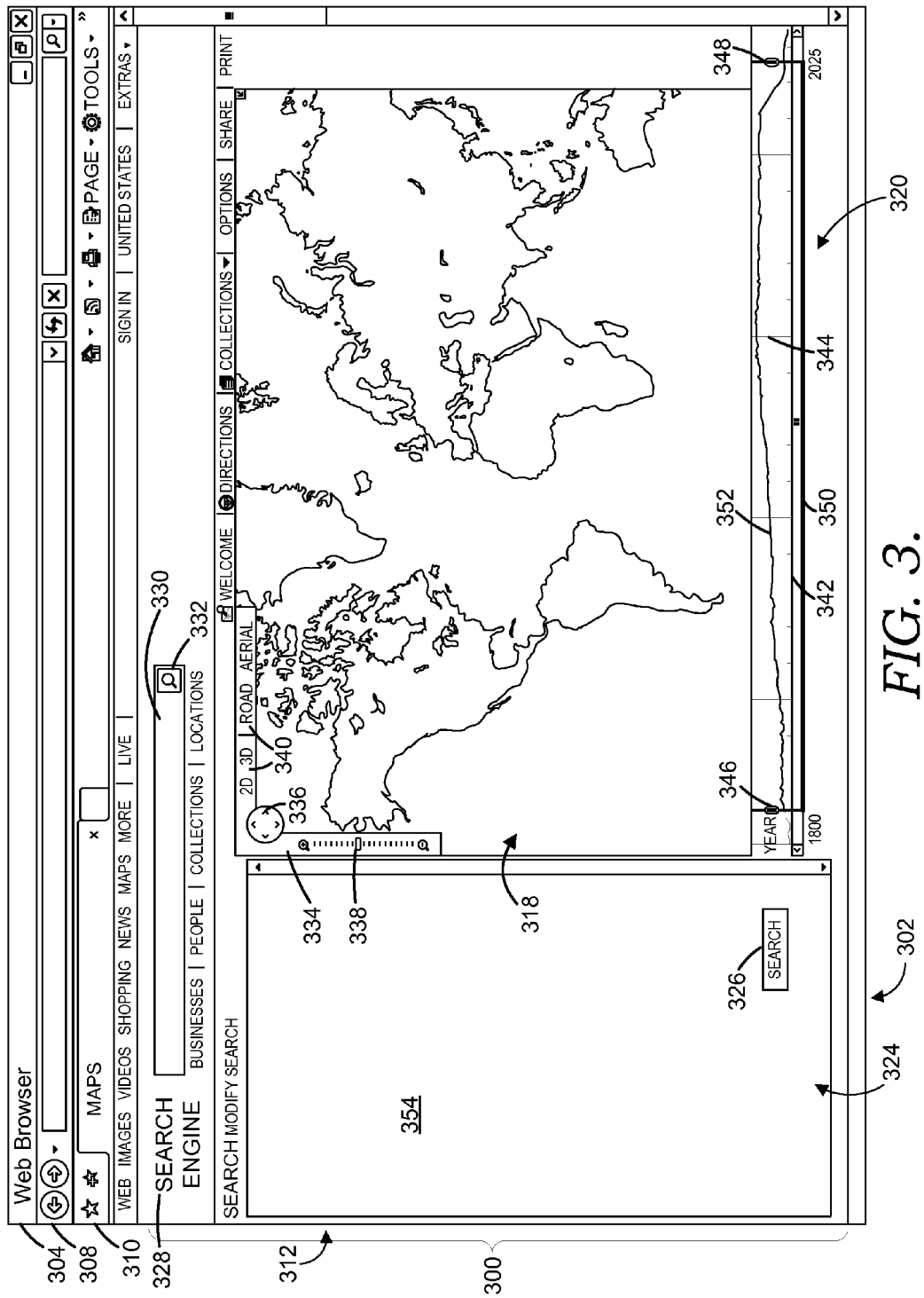
FIG. 3 is an illustration of an exemplary search interface in accordance with an embodiment of the invention.

Referring now to FIG. 3, a search interface 300 is described in accordance with an embodiment of the invention. It is understood that the visual representation of the search interface of embodiments of the invention may take on numerous different configurations and include numerous components or subcomponents, all of which cannot be described herein, but are intended to be included within the scope of the invention.

The search interface 300 is depicted herein with respect to a web browser window 302 as the search interface 300 might be presented on a display device or monitor associated with a personal computer, however the search interface 300 may be presented in any desired format or configuration without departing from the scope of the invention. In an embodiment, the search interface 300 is presented in its own window and is provided as a stand-alone component separate from a web browser. In another embodiment, the search interface is configured for and provided on a display of a mobile device such as a mobile phone, smart phone, or Blackberry® device.

The web browser window 302 includes any desired fields and components known in the art, such as, for example and not limitation, a title bar 304, a menu bar (not shown), a navigation bar 308, one or more toolbars 310, and a display pane 312. Each of the components 304-312 are generally known in the art and may take various forms and configurations in web browser windows 302 provided by various software providers. One or more of the components 304-312 may be modified or excluded from a web browser window 302 either by design of a software provider or by a preference or customization of the web browser window 302 by a user.

With continued reference to FIG. 3, the search interface 300 is presented in the display pane 312. The search interface 300 includes a location portion 318 and a timeline portion 320. The search interface 300 may also include a search results window 324 and a geotemporal search button 326 as well as various common search engine display elements such as a search engine title 328, a search query field 330, and a search button 332, among others.

In an embodiment, the location portion 318 includes a geographic image such as a map, an aerial view image such as a satellite photograph, or a hybrid image, e.g., an aerial view image with map features superimposed thereon, among other geographic images available in the art and hereinafter referred to generally as "maps." The location portion 318 also includes one or more navigation features 334. The navigation features 334 include arrow buttons 336 for moving the map in a desired direction and a zoom scroll 338 for zooming in or out on the map view. Additional icons 340 may also be provided for adjusting the map view by displaying additional geographic features or changing the viewing perspective between two-dimensional and three-dimensional, among others. In an embodiment, a user can also adjust the view of a map in the location portion 318 without the use of the navigation features 334 and icons 340 such as by providing a click-and-drag input or a scroll input via a mouse input device, among other adjustment inputs available in the art.

The timeline portion 320 includes a linear axis 342 on which a desired period of time is depicted. The period of time is any desired period of time ranging from any time in the past to any time in the future. The period of time depicted by the timeline portion 320 is selectable and adjustable by a user. Gradations 344 may be included along the linear axis 342 at any desired intervals to aid interpreting the timeline.

Two sliders 346 and 348 are also included on the timeline portion 320 and denote a start time and an end time corresponding to the position of the sliders 346 and 348 along the linear axis 342. The position of the sliders 346 and 348 is selectable by a user by providing a click-and-drag input from a mouse, by entering a desired date in a date field (not shown), or by any other method available in the art. The sliders 346 and 348 are fully independently adjustable such that a time window 350 between the two sliders 346 and 348 can be adjusted to any desired size. In an embodiment, the time window 350 is set to a pre-determined interval or is adjustable in increments of a predetermined size.

The timeline portion 320 also includes a search results distribution line 352 that indicates a distribution of the number of search results, plotted with respect to time, that correspond to the area of the map displayed in the location portion 318 as is further described below.

Figure 6:
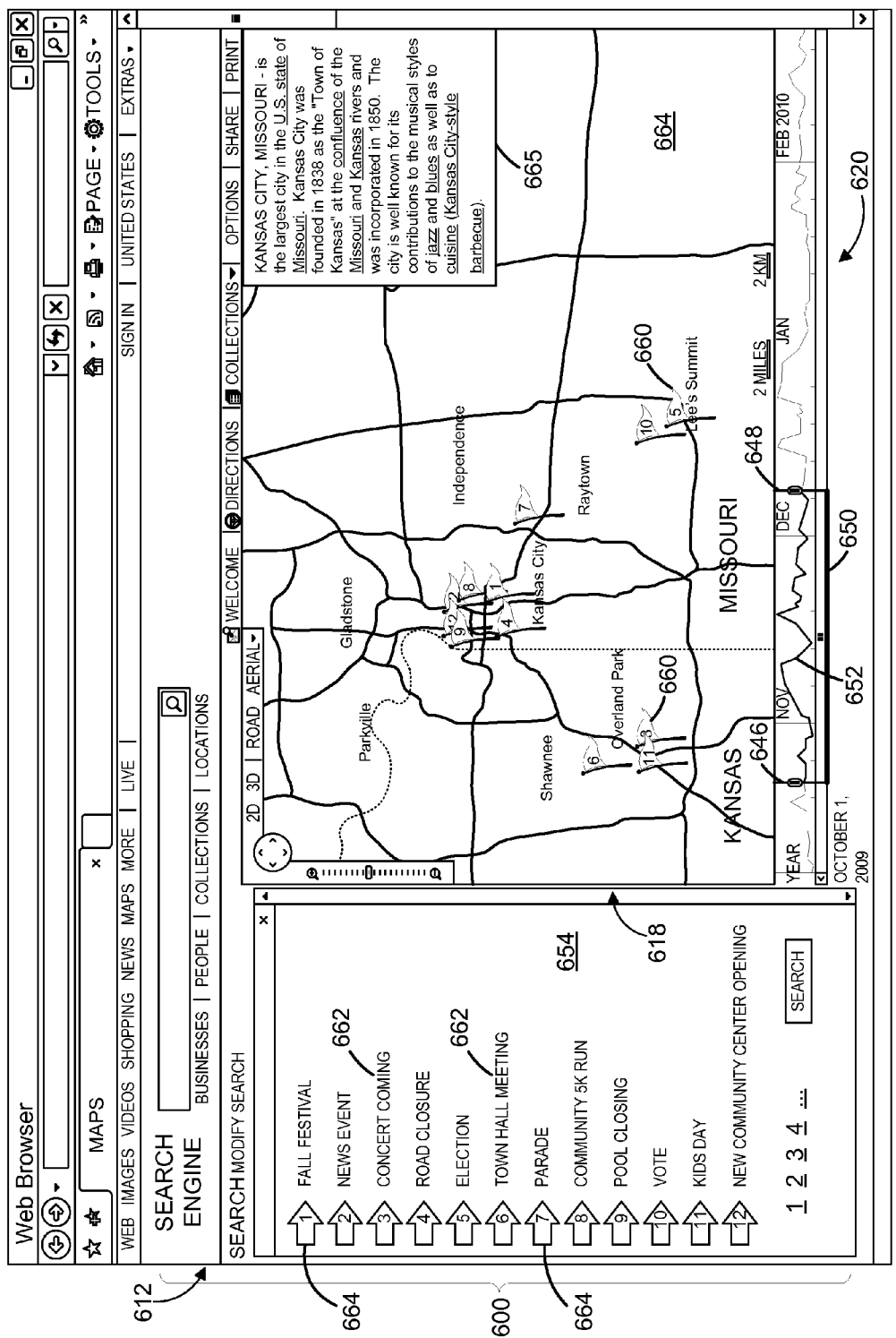
FIGS. 6 and 7 are illustrations of exemplary search interfaces depicting pinpoint locations of search results on a map in accordance with embodiments of the invention.
Figure 7:
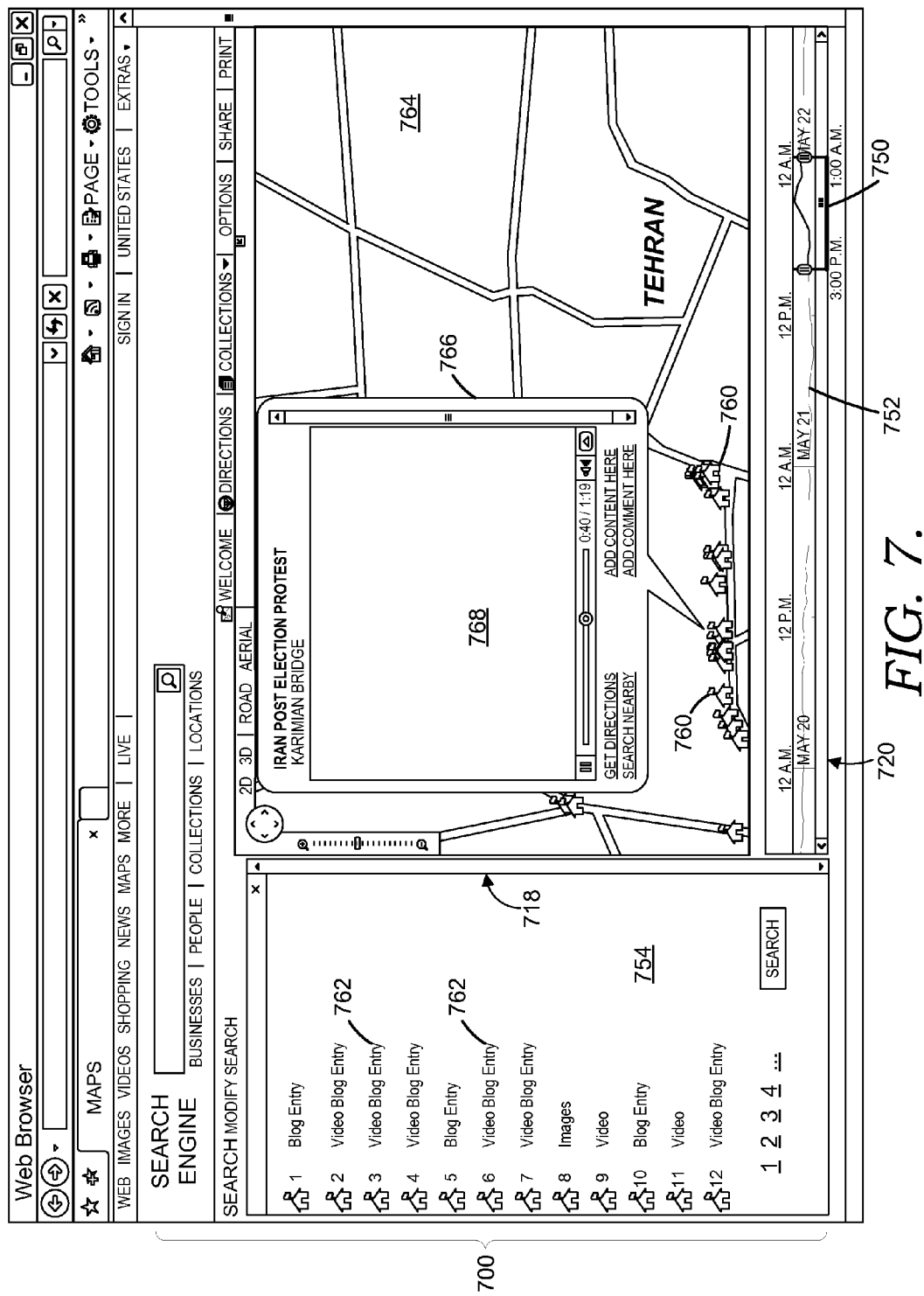
Figure 9:
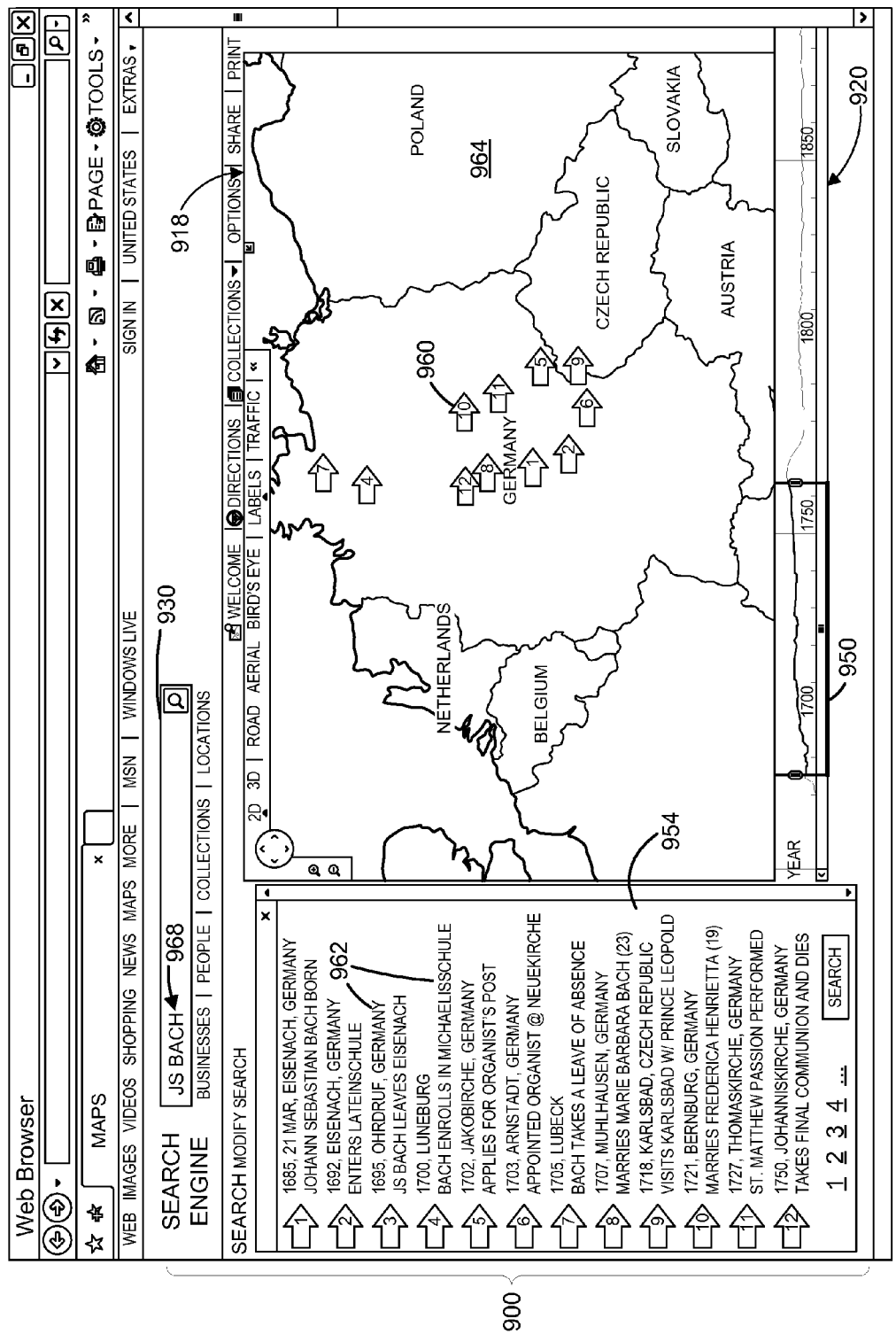
FIG. 9 is an illustration of an exemplary search interface depicting geotemporal search results that are refined by a search term in accordance with an embodiment of the invention.

In an embodiment, the search interface 300 also includes a search results portion 354. The search results portion 354 provides search results as depicted in FIGS. 6-7 and 9. The search results provided in the search results portion 354 include text, URL addresses, icons, advertisements, or any other content known in the art to be provided as search results. In an embodiment, the search results portion 354 is at least partially blank until a geotemporal search is executed, as depicted in FIG. 3. In another embodiment, the search results portion 354 is occupied by one or more search results, links to websites, icons, images, and/or advertisements prior to a user executing a geotemporal search. In yet another embodiment, the search results portion 354 is occupied by one or more search results that have been identified from the execution of a standard search query. A standard search query, as referred to herein, is a text-based or content-based search query that utilizes a search term provided in a search field as is known in the art, and does not employ a geotemporal search as described herein.

Figure 4:
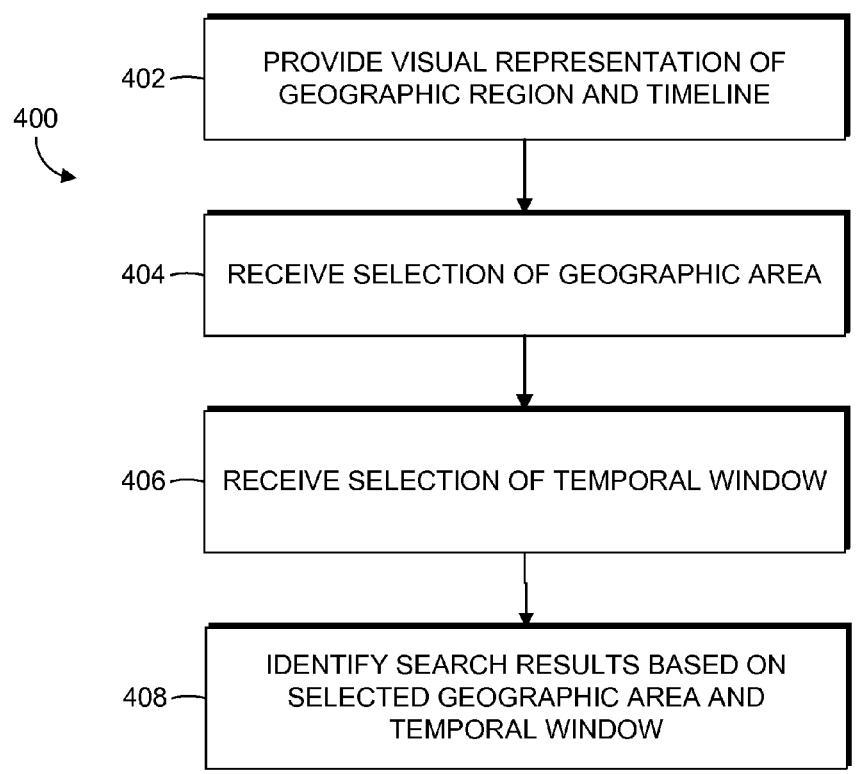
FIG. 4 is a flow diagram depicting a method for identifying search results based on a graphical user-interface in accordance with an embodiment of the invention.

With additional reference to FIG. 4, a method 400 for identifying search results based on a graphical user-interface is described in accordance with an embodiment of the invention. At 402, a visual representation of a geographic region and a timeline, such as the map and timeline displayed in the location portion 318 and timeline portion 320 of the search interface 300. The visual representation of the geographic region (hereinafter "map") is initially a map encompassing the majority of the world or the map may be of a smaller region or area of the world. In an embodiment, metadata for a user or a user's device is stored locally to the user's device or separately therefrom and is employed to determine a home location or an initial location. From the home location, a map depicting an area relevant to the home location is initially presented to the user.

In an embodiment, the user's device includes global positioning system (GPS) technology or employs another positioning technology that identifies a current location of the device. The current location of the device is used as an initial or default location for a geotemporal search. A predetermined radius or area around the initial location is provided by an administrator or by a user-selected preference setting to define the geographic area used for the geotemporal search. In another embodiment, an internet protocol (IP) address of the user's device is used to identify or approximate the current location of the user's device and the identified current location employed as the initial or default location for a geotemporal search.

The visual representation of the timeline is configured in a manner similar to that of the map. The timeline initially encompasses the majority of modern time, such as for example 1800 to present, and might include several years into the future, but can encompass any desired time period. In an embodiment, metadata for a user or a user's device is used to determine an initial time period that might be desired by the user. In an embodiment, the initial time period is determined based on the current time. The current time is identified based on a clock or timer included on the user's device. An initial time window around the current time is predetermined by an administrator or by user preselected preference settings. For example, the timeline might initially be set to include twenty-four hours prior to the identified current time and a week into the future.

At 404, a selection of a geographic area is received. The selection of the geographic area is provided by a user by adjusting the view of the map to encompass a desired location. For example, the user might zoom in and move the map view to a particular city or region. In an embodiment, the initial map view is not adjusted and the initial map view is selected.

At 406, a selection of a temporal window is selected. The temporal window is selected by a user adjusting sliders, such as sliders 346 and 348, or other indicators to desired start and end points along the timeline. The temporal window is the time period designated between the start and end points and may be inclusive of the endpoints. The sliders are adjusted to any points on the initially presented timeline or can be adjusted to any other desired point in the past, present, or future. In another embodiment, the sliders are adjusted by entering a date and/or time into a start or end time field. In another embodiment, the sliders are not adjusted and the initially presented temporal window is selected.

In an embodiment, an input is received from a user to execute a geotemporal based on the currently selected geographic area and temporal window. In another embodiment, a geotemporal search is automatically executed each time a user adjusts the geographic area or the temporal window in the search interface. In another embodiment, an initial geotemporal search is provided based on the initial or default location and time. At 408, geotemporal search results are identified based on the selected geographic area and temporal window.

The area of the map visible on the search interface is used to constrain the search results to only those search results that include metadata indicating a relationship between the search result and a location within the visible area of the map. Thus, candidate search results that do not have metadata indicating a relationship between the candidate search result and a location visible on the map are not returned as search results. In an embodiment, the ranges of the longitude and latitude of the currently selected visible map area are employed and correlated with longitude and latitude metadata associated with the candidate search results to identify matching search results.

The requirements of the relationship between the candidate search result metadata and the visible area of the map that identify the candidate search result as a search result are configured in any desired manner. The relationship may be fully inclusive, mostly inclusive, only partially inclusive, or more broadly related. For example, where the visible area of the map displays a major city and the surrounding metropolitan area a candidate search result having associated metadata indicating a relationship with a location in the major city and visible on the map would be identified as a search result based on the location associated with the search result being fully included in the visible area of the map. A candidate search result that is associated with a suburb of the major city that is only partially visible on the map might be identified as a search result based on the partial inclusion of the suburb in the visible area of the map. Further, a candidate search result that is associated with the state in which the major city is located might be identified as a search result based on a broader relationship, e.g. the state is at least partially visible in the map view and the search result is associated with the state, thus the search result is related to the visible area of the map.

In another embodiment, the degree of zoom of the map is utilized to adjust or inform the geotemporal search. The map can be zoomed from a wide world view down to a street level view and to various levels therebetween, such as, for example a continent level that generally depicts one of the seven continents of the world, a country view the generally depicts one or more individual countries, a state or sub-country level the depicts sub-divisions within a country, and multiple further subdivisions thereof. As such, the level of zoom to which the location metadata for a candidate search result corresponds can be utilized to constrain which candidate search results are identified as search results. For example, the candidate search result described above that is associated with the state in which the major city is located is identified as a search result when the map is zoomed to the state level but is not identified as a search result when the map is zoomed in to the city or street level. Various algorithms and relationships may be employed to implement such constraints.

The temporal window is also used to constrain the search results. Only candidate search results that include metadata indicating a relationship between the candidate search result and a time included within the temporal window are returned as search results. Thus, candidate search results that are not associated with metadata indicating a relationship with a time included in the temporal widow are not returned as search results. Similarly to that described above with respect to the visible area of the map, the requirements of the relationship between the candidate search result metadata and the temporal window that identify the candidate search result as a search result are configured in any desired manner. The relationship may be fully inclusive, mostly inclusive, at least partially inclusive, or may employ various other requirements. For example, candidate search result associated with a date or time period occurring fully within the temporal window has a fully inclusive relationship with the temporal window, while a candidate search result associated with a time period that overlaps with the temporal window has a partially inclusive relationship.

By combining the constraints based on the visible area of the map and the temporal window, only candidate search results that are related to both the geographic area and the temporal window are provided to the user. The user may narrow or broaden the search by adjusting the visible area of the map or by adjusting the size or location of the temporal window. As such, a geotemporal search is conducted without the use of any textual search terms provided by a user. Further, using the visible area of the map to define the search query provides a simplified method for conducting a search for search results related to a location. Such a search may not be possible using text-based search without a very extensive knowledge of geographic area to be searched and a well-crafted, extensive textual search query.

Figure 5:
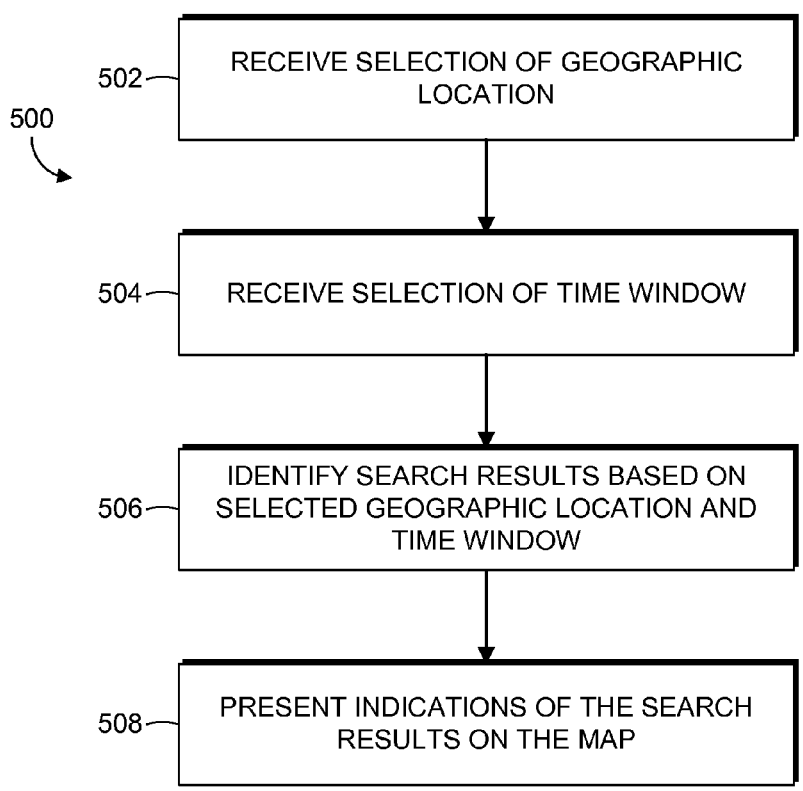
FIG. 5 is a flow diagram depicting a method for providing a geotemporal search in accordance with an embodiment of the invention.

With reference to FIG. 5, a method 500 for providing a geotemporal search is described in accordance with an embodiment of the invention. At 502, a selection of a geographic location is received. The selection is provided by a user navigating the visible portion of a map to a desired location or by selecting the map as initially presented to the user. At 504, a selection of a time window is received by a user adjusting the location of a start and end time indicator along a timeline or by selecting the time window initially presented. At 506, one or more geotemporal search results are identified based on the selected geographic location and time window. The geotemporal search results include metadata that indicates a relationship between the each of the search results and the selected geographic location and time. At 508, indications of the geotemporal search results are presented on the map.

The indications ("indicators") include a graphic, image, or the like that can be displayed on a map. For example, the indicators might include an image or graphic of a flag (indicators 660, FIG. 6), a house (indicators 760, FIG. 7), or an arrow (indications 960, FIG. 9), among a variety of others. The indicators are located on the map at or near the location indicated by the metadata associated with the search result that is represented by the indicator. As depicted in FIG. 6, the indicators 660 may include a number or other reference to allow a user to identify the indicators 660 with a corresponding search result listing 662 provided in a search result pane 654. In an embodiment, the indicators are also selectable by a user to present or direct the user to content of the search result associated with a particular indicator.

With continued reference to FIG. 6, an exemplary search interface 600 depicting pinpoint locations (indicators 660) of search results on a map 664 in accordance with an embodiment of the invention is described. As described previously with respect to FIG. 3, the search interface 600 is displayed in a display pane 612 of a Web browser window 602. The search interface 600 includes a location portion 618 displaying a map 664 that depicts the geographic area around Kansas City, Mo. The search interface 600 also includes a timeline portion 620 that depicts sliders 646 and 648 delimiting a temporal window 650 spanning from mid October 2009 through early December 2009. The search interface also includes a search results pane 654 that provides search results listings 662. The listings 662 may be selectable by a user to present or direct the user to content of the search result associated with a particular listing 662. Each of the listings 662 may also include an associated indicator 664 that aids in identifying a corresponding indicator 660 on the map 664.

The search interface 600 also includes a geographic location information pane 665. The geographic location information pane 665 provides content regarding a location within the selected geographic area depicted on the map 664, or may provide one or more advertisements or other information relevant to the geographic area or selected time window. For example, the pane 665 provides general information about Kansas City, Mo. as depicted in FIG. 6.

As depicted in FIG. 6, the map has been navigated and zoomed to the Kansas City, Mo. area and the temporal window adjusted as described above. A geotemporal search has been conducted based on the selected location and temporal window and the geotemporal search results are provided as indicators 660 and listings 662. As such, search results relating to the selected visible location and time are provided without a user providing a textual search term or input other than selection of the visible map area and temporal window. Further, the user is provided with a visual presentation of the location of the search results that may aid the user in identifying one or more desired results.

The geotemporal search depicted in FIG. 6 might be conducted for a variety of reasons including, for example, a user planning a trip, conducting research, or mere curiosity, among others. For example, assuming a user decides to take a trip to Kansas City, Mo. during the first week of November 2009, the user might navigate the map 664 as depicted in FIG. 6. The user might also adjust the sliders 646 and 648 dates and times in the future such as a date a week or so prior to their trip and a week or two after, also as depicted in FIG. 6. Thereby, the geotemporal search conducted based on the selections would provide the user with search results and information pertinent to both the location and time of their planned trip. Further, the user would also be provided with indicators 660 of the location of search results to aid the user in identifying search results that might, for example, be near their hotel. The user might also note that there is a spike or increase in the search results distribution based on a distribution line 652 during the second week of November. Thus, the user can narrow the temporal window 650 by adjusting the sliders 646 and 648 to either side of the spike to identify search results occurring during that week. As such, the user might decide to delay their trip one week so as to take advantage of events indicated by the newly identified search results.

With reference now to FIG. 7, in another embodiment a geotemporal search is conducted of web logs ("blogs") and other user uploaded content. FIG. 7 depicts an exemplary search interface 700 depicting locations of blog entries and the like in accordance with an embodiment of the invention. Like the search interface 600, the search interface 700 includes a location portion 718, a timeline portion 720, and a search results pane 754 configured similarly to those of the search interface 600. As depicted in FIG. 7 a geotemporal search of blogs and similar content has been conducted for a selected location around Tehran, Iran. A time window 750 spanning between 3:00 P.M. and 1:00 A.M. has been selected. In an embodiment, the time window 750 is selected by a user due to a noted spike in the number of search results depicted during that time period by a search result distribution line 752. The search interface 700 further provides indicators 760 of the location of the geotemporal search results and search result listings 762 in the search results pane 754.

FIG. 7 also depicts a viewing window 766 that is presented in response to a user selection of an indicator 760 displayed on a map 764. The indicator 760 may be selected by providing an input to the indicator or by providing an input to a corresponding listing 762 in the search results pane 754. The viewing window 766 provides the user with the content of the search result associated with the selected indicator 760. In an embodiment, the content associated with the indicator 760 is a video file that is played in a video pane 768 of the viewing window 766.

Similarly to that described with respect to FIG. 6, the geotemporal search depicted in FIG. 7 might be conducted for a variety of reasons. For example, on May 21 a user may hear that an election is being held in Iran and that protests are currently occurring. The user, interested in such events, might conduct a geotemporal search of blogs and related websites around 11:00 P.M. on May 21 to get the most recent news about the elections and protests. As such, the user can tailor their geotemporal search to a specific location of interest (e.g., Tehran) and to a specific time frame (e.g., the last few hours) to obtain only the most recent and relevant search results.

Figure 8:
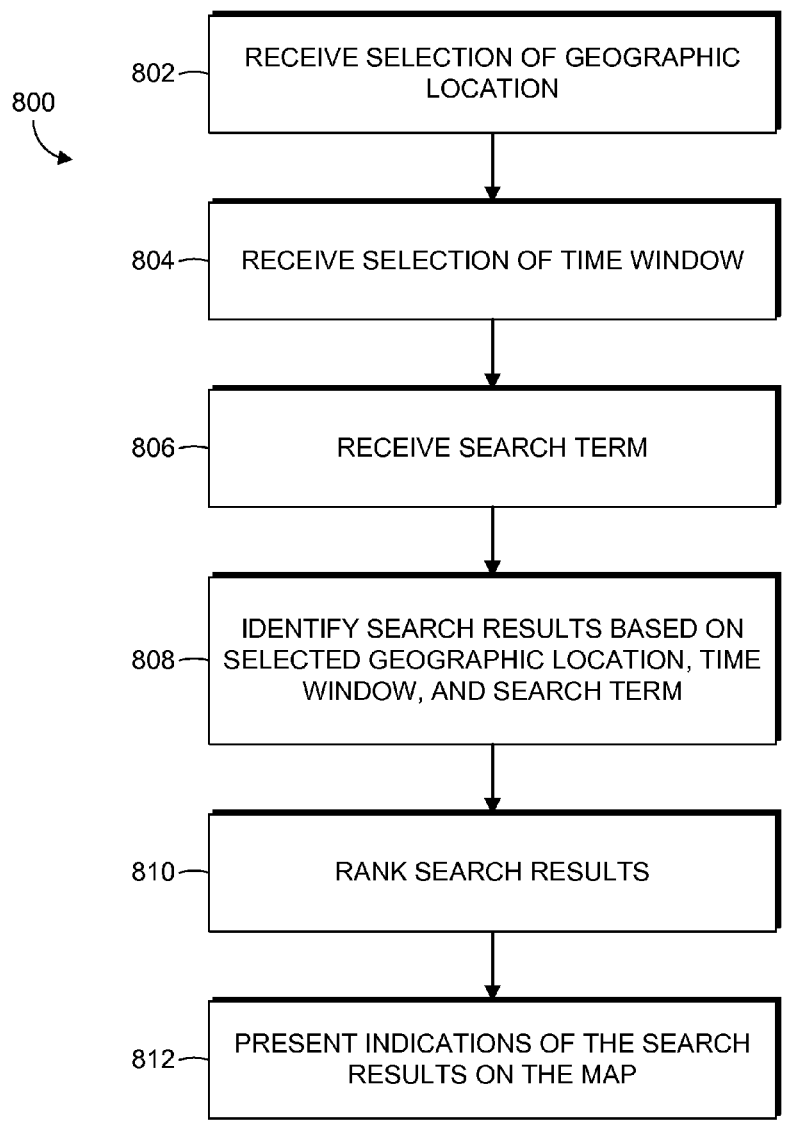
FIG. 8 is a flow diagram depicting a method for providing a geotemporal search that is refined by a search term in accordance with an embodiment of the invention.

Referring now to FIGS. 8 and 9, a method for providing a geotemporal search that is refined by a search term is described in accordance with an embodiment of the invention. As described previously, a selection of a geographic location and a time window are received at 802 and 804. As depicted in FIG. 9, a map 964 in a location portion 918 of a search interface 900 is navigated to a northern region of Europe including Germany and a time window 950 in a timeline portion 920 has been adjusted to include the years from about 1685 through 1765. In an embodiment, the appearance of the map 964 is adjusted based on the selected time window 950 to reflect the political boundaries (e.g., country borders) and physical infrastructure (e.g., roads and the like) that were present during the selected time window 950.

At 806, one or more search terms 968 are received at a search query field 930 as is known in the art. At 808, search results are identified based on the selected geographic location and time window and the search terms 968. In an embodiment, the search results are identified based on the selected geographic location and time window and then refined based on the search terms 968, however the search results can be identified based on the constraints in any desired fashion and order.

At 810, the search results are ranked by any available means. For example, the search results can be ranked by date, or by semantic relationships with the search terms, location, or time window, among a variety of other ranking systems and algorithms. At 812, indications 960 of the search results are presented on the map 964. Search result listings 962 are also presented in a search results pane 954.

As depicted in FIG. 9, the geotemporal search is refined by the search terms 968 to provide search results relevant to the selected visible are of the map 964, the selected time window 950, and the search terms 968 "JS BACH." As such, the search results, ranked in order of their respective associated dates and indicated on the map 964, provide a chronological presentation of search results related to the musician/composer Johann Sebastian Bach. Thus, a user wanting to learn about the life and times of Bach can easily select one or more of the search results to view the content associated therewith.

Alternatively, a user that does not know when Bach lived but wants to learn about daily life during that time, might employ a similar geotemporal search with a broader time window 950 to identify when Bach lived. The user could then adjust the time window 950 to only include the years when Bach was alive. The user might also remove the search terms 968 from the search query field 930 in order to receive all search results relating to the time and location of Bach's life, but not necessarily relating directly to Bach.

In other embodiments of the invention, adjustments to the geographic location selection, the time window selection, and any provided search terms can be employed to tailor a geotemporal search in a multitude of ways and to allow searching for any desired content or for any desired purpose. In another embodiment, one or more of the selected geographic location, time window, and search terms are utilized to identify advertisements, listings, and other information to present to a user. In another embodiment, one or more filters are provided for further filtering search results based on content, search result type, or search result features, among others. Such filters might include for example, and not limitation, "news," "videos," "images," "xRank," "travel," "mobile," "shopping," and "reference."

In another embodiment, not depicted in the figures, the timeline portion is expanded and one or more indicators, similar to indicators 660, are provided on the timeline at positions correlating with their respective date metadata. As such, the search results can be selected from the indicators on the timeline in addition to, or instead of, from indicators presented on a map or in a search results pane.

Many different arrangements of the various components depicted, as well as components not shown, are possible without departing from the scope of the claims below. Embodiments of the technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. One or more computer-storage media storing computer-executable instructions embodied thereon that, when executed by a computing device, perform a method for identifying search results based on a graphical user-interface, the method comprising:

providing a visual representation of a geographic region and a timeline, the visual representation being useable to select a geographic area within the geographic region for searching and the timeline being useable to select a temporal window for searching, and the geographic region and the timeline being presented on a graphical interface;

receiving a selection of the geographic area in the geographic region, the geographic area including a portion of the geographic region that is visible on the graphical interface and forming geographic bounds within which to perform a search, the selection of the geographic area being provided by adjusting a visible area of the geographic region on the graphical interface;

receiving a selection of a temporal window in the timeline, the temporal window delineating temporal bounds within which to perform the search;

identifying one or more search results that are semantically related to both the geographic area and the temporal window, the search results being identified from a datastore that houses a plurality of search results that include one or more associated metadata indicating a relationship with a location and a time, and the location and the time falling within the geographic bounds of the geographic area and within the temporal bounds of the temporal window respectively.

2. The media of claim 1, further comprising:
ranking the one or more search results based at least on their relationship to the geographic area and the temporal window.

3. The media of claim 1, further comprising:
receiving an indication of a change in one or both of the geographic area and the temporal window; and
identifying one or more changed search results based on the changed one or both of the geographic area and the changed temporal window, wherein the changed search results are the same or different from the one or more search results.

4. The media of claim 1, further comprising:
receiving a search query term;
refining the one or more search results based on the search query term.

5. The media of claim 1, wherein the indication of the temporal window is provided by selecting a start time and an end time on the timeline, and wherein the start time and the end time are one or more of a time in the past, present, or future.

6. The media of claim 1, wherein the plurality of search results include data elements uploaded to the datastore by a user, the data elements including metadata describing one or more of the time and geographic location from which the data elements were uploaded to the datastore, and a user-identified time and geographic location associated with the data elements.

7. The media of claim 1, wherein an indicator of one or more of the search results are plotted on the visual representation of the geographic area at a location corresponding to the metadata associated with the search result.

8. The media of claim 1, wherein an indicator of one or more of the search results are plotted on the visual representation of the temporal window at a location corresponding to the metadata associated with the search result.

9. A computing device having a processor for generating a search interface, the search interface comprising:
a location portion in which a visual representation of a geographic area is presented, the visual representation being useable to identify a geographic location for searching;
a timeline portion in which a visual representation of a temporal window is identified and comprises a timeline that depicts a temporal distribution of search results, the timeline portion including one or more features for adjusting a location and length of the temporal window including a first slider for selecting a start time and a second slider for selecting an end time of the temporal region, the first and second sliders being set to any time in the past, present, or future;
indications of one or more search results that are identified based on the geographic location that is visible in the location portion and based on the temporal window that is identified in the timeline portion; and
an indication of a pinpoint location associated with each of the one or more search results that is displayed at a respective location on the visual representation of the geographic area in the location portion, the indications being selectable to view content associated with the search result.

10. The computing device of claim 9, wherein the visual representation of the geographic area includes one of a map, an image, or a hybrid image.

11. The computing device of claim 9, further comprising:
a search results portion displaying at least a portion of the content associated with the search results.

12. The computing device of claim 9, further comprising:
a geographic location information portion that displays content associated with the identified geographic location.

13. The computing device of claim 9, further comprising:
a search query field that is configured to receive a search term, wherein the one or more search results are refined based on the search term.

14. One or more computer-storage media storing computer-executable instructions embodied thereon that, when executed, perform a method for providing a geotemporal search, the method comprising:
receiving a selection of a geographic location via a geographic location selection portion of a graphical user-interface (GUI) that includes a map comprising one or more of a drawing, an image, and a hybrid image, and includes a feature for navigating the map to a desired geographic location;
receiving a selection of a time window via a temporal region selection portion of the GUI comprising a timeline having a feature for selecting a start time and an end time for the time window, wherein the start time and end time are in one or more of the past, present, or future;
identifying a search result based on the selected geographic location and time window when the search result is relevant to a location that is currently visible on the map and a time that is currently included in the time window, wherein the search result is one or more of related to the selected geographic location and time window or is associated with metadata corresponding to the geographic location and time window; and
presenting an indication of the search result on the map at a location therein that corresponds to one or more of the content and metadata associated with the search result.

15. The media of claim 14, further comprising:
receiving a search term at a search query field; and
identifying the search result based on the selected geographic location, the selected time window, and the search term.

16. The media of claim 14, further comprising:
identifying one or more of an advertisement and a paid listing that are relevant to one or more of the geographic location and the time window.

* * * * *